United States Patent [19]

Mori

[11] Patent Number: 5,163,709
[45] Date of Patent: Nov. 17, 1992

[54] PRELOADER

[75] Inventor: Shinji Mori, Aichi, Japan

[73] Assignee: Kabushiki Kaisha Tokai-Rika-Denki-Seisakusho, Japan

[21] Appl. No.: 670,902

[22] Filed: Mar. 18, 1991

[30] Foreign Application Priority Data

Mar. 28, 1990 [JP] Japan .................................. 2-32568

[51] Int. Cl.⁵ ............................................. B60R 22/46
[52] U.S. Cl. .................................................... 280/806
[58] Field of Search ................ 280/806, 807; 297/480, 297/478

[56] References Cited

U.S. PATENT DOCUMENTS 3,879,054  4/1975  Lindblad ............................. 280/806
4,955,638  9/1990  Kinoshita et al. .................... 280/806

FOREIGN PATENT DOCUMENTS

154449  6/1988  Japan ................................. 280/806
257642 10/1989  Japan ................................. 280/806

*Primary Examiner*—Charles A. Marmor
*Assistant Examiner*—Tamara L. Graysay
*Attorney, Agent, or Firm*—Sixbey, Friedman, Leedom & Ferguson

[57] ABSTRACT

A preloader characteristically comprises the following: a preloader sensor unit comprising an inertial member and an ignition member fixed to a detonator by the movement of the inertial member; in accommodating portion accommodating the preloader sensor unit; a supporting member in which the accommodating portion is installed by the rotation of the accommodating portion, where the accommodating portion is rotated around a direction of the fire of the ignition pin at an optional or predetermined interval of rotative angle from reference position; a display member which is provided on the external surface of the accommodating portion and has a specific positional relationship with the inertial member and displays the positional relationship with the inertial member; and positioning members respectively provided for the accommodating portion and the supporting member for positioning the accommodating portion to the supporting member in relation to the display of the display member. Independent of the axial-directional inclined angle of the winding shaft against the vertical direction of the vehicle body, the inertial member can be set to the predetermined angle merely by adjusting the angle based on the shooting direction of the ignition member in the course of securing the accommodating portion to the supporting member by applying the display member and the positioning member. A common preloader sensor unit can also be made available.

20 Claims, 10 Drawing Sheets

PRELOADER

BACKGROUND OF THE INVENTION

1. Field of the Invention

The present invention relates to a preloader which is applied to a webbing retractor for tightly restraining a vehicle occupant with a webbing when a vehicle suddenly decelerates.

2. Description of Related Art

Any conventional seal belt apparatus is designed to firmly restrain the vehicle occupant with a webbing when the vehicle suddenly decelerates. However, if there is any gap between the webbing and the occupant, a restraining effect cannot fully be exerted. To compensate for this, there is a webbing retractor integrally provided with a preloader which tightly restrains the vehicle occupant by forcibly retracting the webbing in the retracting direction when the vehicle suddenly decelerates. This preloader incorporates a preloader sensor which is activated simultaneously with the sudden deceleration of the vehicle s that the preloader can instantaneously be operated.

When installing a webbing retractor to a vehicle, the automobile manufacturer needs to properly adjust the securing position, in particular, the inclined angle of the webbing retractor along the axial line of the fixing bolt, secured in the widthwise direction of the vehicle body, according to the type of vehicle and whether the steering wheel is positioned on the left side or on the right side. If a different inclined angle of the webbing retractor is introduced, it in turn obliges the manufacturer to also modify the inclined angle of the preloader before the preloader is integrated with the webbing retractor.

Whenever modification is planned, the manufacturer of the webbing retractor is obliged to renew design work and rearrange the manufacturing of all the component parts of the preloader so that these components can be compatible with the modified inclined angle. This in turn obliges those who are engaged in the design and manufacturing work to incur an excessive volume of work, thus resulting in an increase in cost.

SUMMARY OF THE INVENTION

The object of the invention is to fully overcome those problems mentioned above by providing a novel preloader which is applicable to the webbing retractor irrespective of the inclined angle of the periphery of the axial line of the fixing bolt securing the webbing retractor in the widthwise direction of the vehicle body and independent of the left-side or right-side steering wheel position.

The invention provides a novel preloader which is built in a webbing retractor for retracting a webbing in order to tightly restrain the vehicle driver or passenger when the vehicle suddenly decelerates. The preloader embodied by the invention comprises the following:

a preloader sensor unit which is provided with an inertial member inertially moving in the forward direction of the vehicle body when the vehicle suddenly decelerates, and an ignition member which fires a detonator by the movement of the inertial member;

an accommodating portion which accommodates the preloader sensor unit;

a supporting member in which the accommodating portion is installable by rotating the accommodating portion at an optional or predetermined interval of rotative angle around a direction of movement of the ignition member;

a display member which is provided on the external surface of the accommodating portion, and has a specific positional relationship with the inertial member, and displays the positional relationship therewith; and positioning members which are respectively provided for the accommodating portion and the supporting member in order to execute a positioning function in relation to the display of the display member when installing the accommodating portion to the supporting member.

Next, functional operation of the preloader embodied by the invention is described below by referring to a first vehicle, which is provided with a preloader and a webbing retractor having a winding shaft whose axial direction is horizontally oriented in the longitudinal direction of the vehicle body, and a second vehicle, which is also provided with a preloader and a webbing retractor which is secured to the vehicle body by tilting the axial direction of the winding shaft in the longitudinal direction of the vehicle body by a predetermined angle.

When installing the webbing retractor to the first vehicle, since the winding shaft has a horizontal axial direction, the inclined angle of the preloader is determined against the horizontal axial line. Next, the position of the accommodating portion is adjusted in correspondence with the supporting member so that the detonator can be positioned in the shooting direction of the ignition member stored in the accommodating portion. When the position of the accommodating portion relative to the supporting member coincides with the position where the detonator is present in the shooting direction of the ignition member, the accommodating portion is secured to the supporting member by means of the positioning member. When assembly of the webbing retractor identical to that used to the first vehicle is applied to the second vehicle, those sequential steps described below.

Since the winding shaft is inclined from the horizontal level, the obliqueness of angle is determined for the preloader in correspondence with the inclined angle of the winding shaft. However, the inclined angle of the preloader applicable to the second vehicle differs from that in the case of the first vehicle.

However, since the ignition member is set to the axial position when securing the accommodating portion to the supporting member, the positional relationship between the ignition member and the detonator is identical to that in the case of the first vehicle. Accordingly, as was done for the first vehicle, first the position of the accommodating portion is adjusted in correspondence with the supporting member so that the detonator can be positioned in the direction of the movement of the ignition member stored in the accommodating portion.

Next, while visually checking the display of the display member indicating the positional relationship with the inertial member, the angle for securing the accommodating portion to the supporting member is determined so that the inertial member can correctly be positioned at a specific angle. While the assembly process is underway, the accommodating portion is secured to the supporting member by means of the positioning member which facilitates assembly of these components at the desired angle.

There exist various ways in which the positioning member can be provided, including the following: a case in which a number of positioning members are provided for each tilted angle of the preloader independent of the accommodating portion; a case in which a number of positioning members are integrated with the accommodating portion in correspondence with every inclined angle of the preloader; and a case in which a positioning member capable of dealing with all the inclined angles of the preloader is integrated with the accommodating portion.

In the event that either the first or second vehicle provided with a webbing retractor suddenly decelerates, the inertial member inertially moves to activate the movement of the ignition member in the direction of the detonator so that the detonator can be ignited. The ignition of the detonator activates operation of the preloader to firmly restrain the vehicle occupant with a webbing.

In this way, independent of the axial-directional inclined angle of the winding shaft against the vertical direction of the vehicle body, the accommodating portion can be secured to the supporting member merely by positioning the accommodating portion at a proper fixing angle which is compatible with the inclined angle by effectively applying the display member and the positioning member in such a condition in which the fixing position of the accommodating portion in relation to the supporting member is compatible with the position of the detonator in the shooting direction of the ignition member.

As is clear from the above description, the preloader embodied by the invention is properly secured to the vehicle body independent of the inclined angle of the axial line of the fixing bolt, which secures the webbing retractor, oriented in the widthwise direction of the vehicle body.

DESCRIPTION OF PREFERRED EMBODIMENTS

Referring now to FIGS. 1 through 7, the structural mechanism of a webbing retractor 10 incorporating the preloader embodied by the invention is described below. The arrowed directions FR, UP, and IN shown in these drawings respectively designate the front, upward, and inward directions of the vehicle body.

Figure 1:
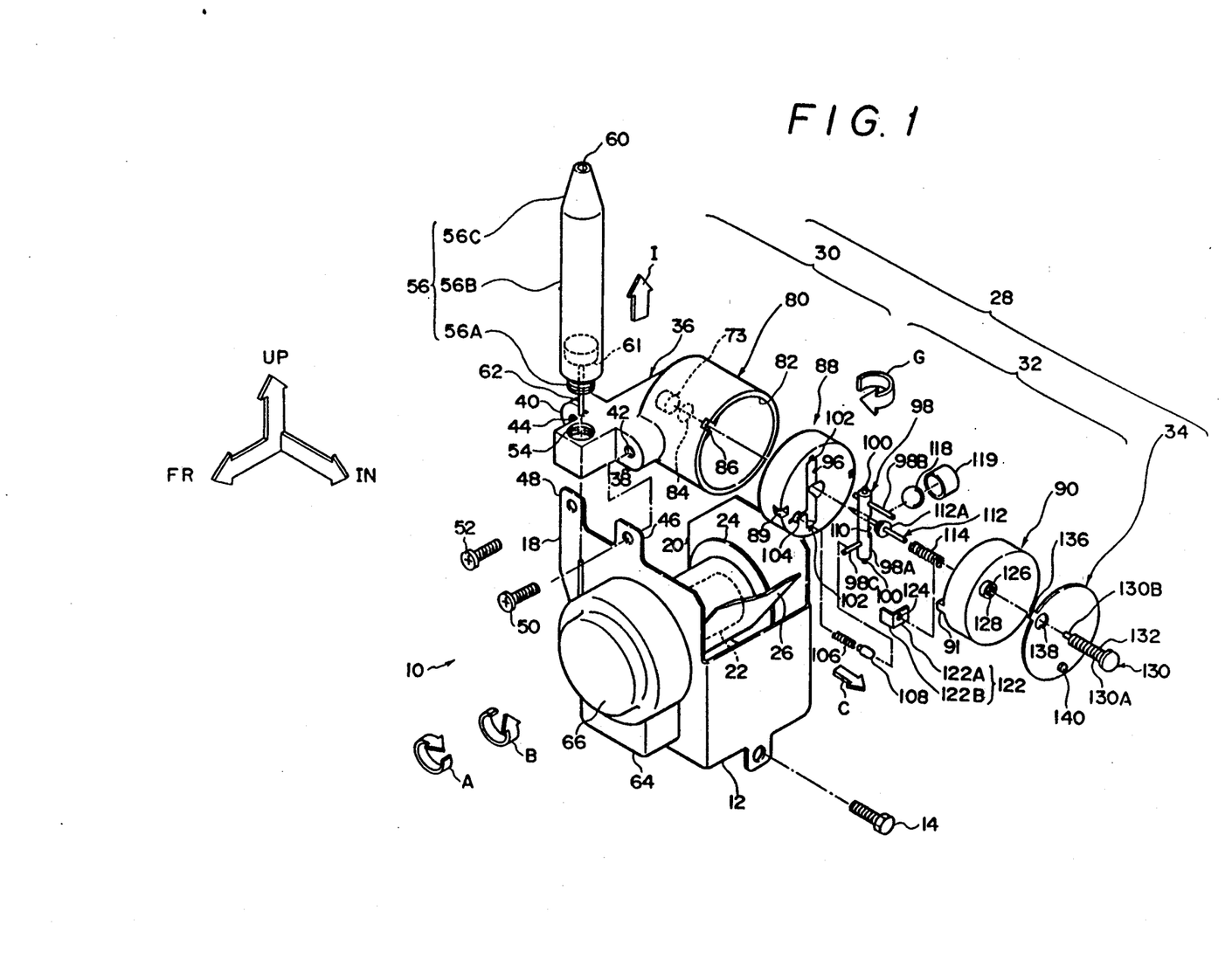
FIG. 1 is a partially disassembled perspective view of a webbing retractor incorporating the preloader embodied by the invention.

FIG. 1 is a partially disassembled perspective view of the webbing retractor 10. The main frame 12 of the webbing retractor 10 is secured to the bottom position of the side wall (not shown) of the vehicle body with a bolt 14. The main frame 12 is provided with a pair of foot plates 18 and 20 having their lateral surfaces orthogonally bent in the outward direction of the vehicle cabin in parallel with each other. A through hole (not shown) is respectively provided through the center of these foot plates 18 and 20. Both ends of a winding shaft 22 are supported through these through holes. The winding shaft 22 is disposed so that its axial direction can be held horizontally in the longitudinal direction of the vehicle body. A spool 24 is coaxially secured to the middle part of the winding shaft 22. The base end of a webbing 26 is engaged with the spool 24. A preloader 28 is installed on the webbing retractor 10.

Next, the structural mechanism of the preloader 28 is described below. As shown in FIG. 1, the preloader 28 consists of a main preloader body 30, a preloader sensor unit 32, and a cover 34. A hollow, box-shaped bracket 36 is provided for the main preloader body 30 above the pair of foot plates 18 and 20 in connection with the webbing retractor 10. An end surface on the part of the floor plate 18 opposite from the aperture end of the bracket 36 is closed. A pair of fixing portions 38 and 40 are integrally formed on both sides of the bracket 36 in the widthwise direction of the vehicle body. This pair of fixing portions 38 and 40 each has a semicircular section in the widthwise direction of the vehicle body, and the fixing portions 38 and 40 respectively have circular holes 42 and 44 in the center. These fixing portions 30 and 40 are respectively secured to a pair of projections 46 and 48 at the tip of the foot plate 18 with bolts 50 and 52.

A through hole 54 for accommodating a cylinder 56 is provided between these fixing portions 38 and 40 through the tip surface of the bracket 36. A female screw is provided on the internal circumferential surface of the through hole 54. The hollow cylinder 56, consisting of a base member 56A, a middle member 56B, and a tip member 56C respectively aligned along the axis, is disposed at a specific position compatible with the through hole 54. The base member 56A has diameter which is smaller than that of the middle member 56B. A male screw provided on the external circumferential surface of the base member 56A is engaged with the female screw of the through hole 54. The tip member 56C is tapered in the upwards direction, and air-outlet hole 60 is provided through the tip member 56C. A piston 61 is slidably stored in the middle member 56B.

An end of a wire 62 is engaged with the bottom edge of the piston 61. The middle of the wire 62 is led inside of a spring complete 64 provided on the lower front surface of the foot plate 18. A cover member 66 is integrated with the spring complete 64. The cover member 66 stores a spring (not shown) whose external end is engaged with the cover member 66. The internal end of this spring is engaged with the winding shaft 22. Because of this mechanism, the winding shaft 22 is energized in the direction of winding the webbing 26 (in the direction of arrow A shown in FIG. 1) to wind up the webbing 26 in the form of a roll. The webbing 26 can be pulled out of the winding shaft 22 by rotating the winding shaft 22 in the pulling-out direction (in the direction of arrow B shown in FIG. 1) against the urging force of the spring stored in the cover member 66. The other end of the wire 62 is linked with the winding shaft 22 via a clutch means.

Figure 2:
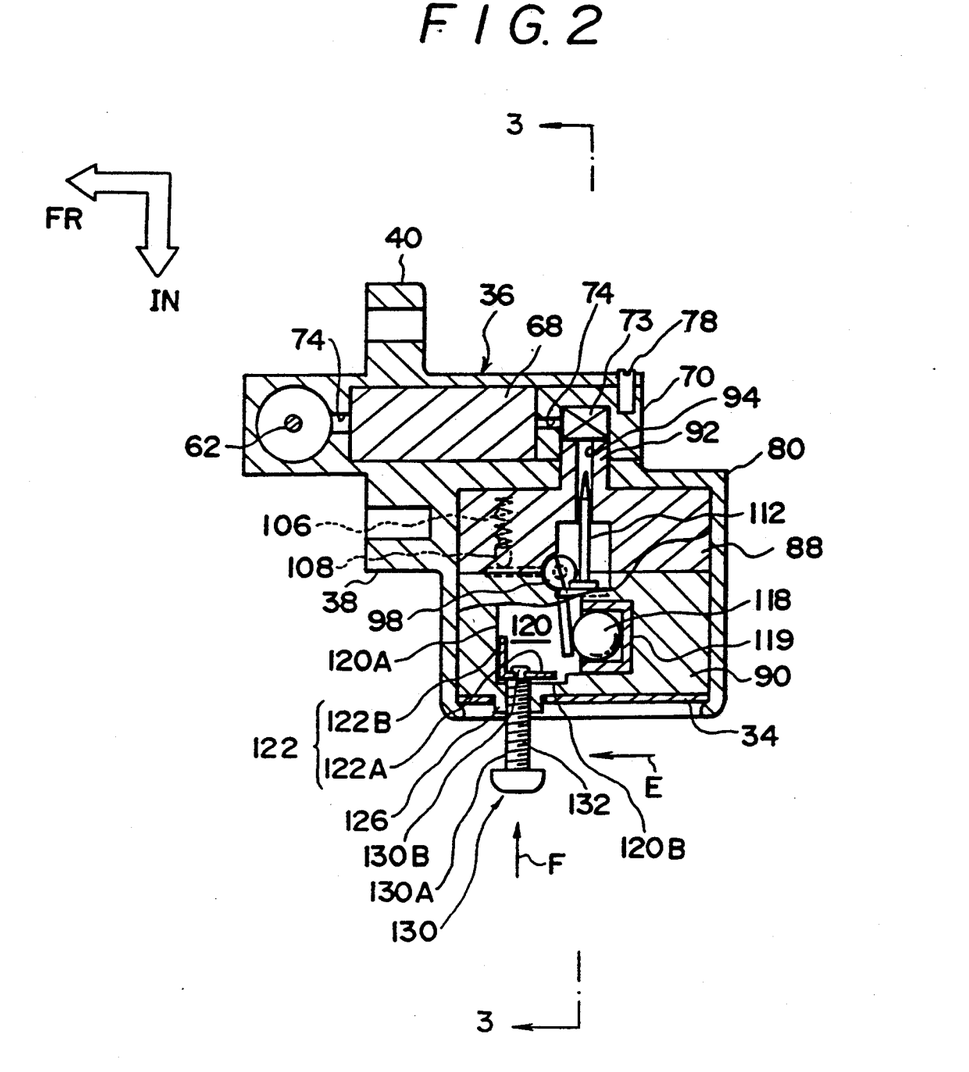
FIG. 2 is a sectional view of main components of the preloader shown in FIG. 1.
Figure 3:
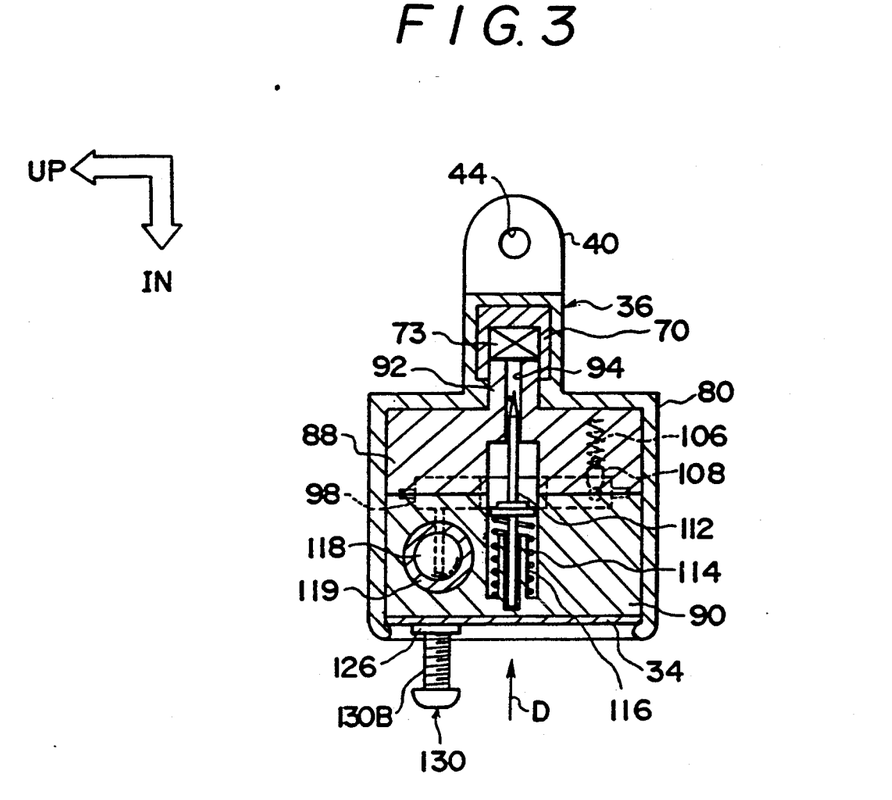
FIG. 3 is a sectional view of the main components of the preloader shown in FIG. 2 taken on line 3 through 3.

On the other hand, as shown in FIG. 2, a cylindrically formed gas-generating agent 68 is stored in the middle space of the bracket 36 in the longitudinal direction. A substantially rectangular-parallelepiped detonator case 70 is tightly stored in a position adjacent to the edge of the aperture of the bracket 36. A cylindrical through-hole (not shown) is provided through the center of the detonator case 70 in the widthwise direction of the vehicle body. A cylindrical detonator 73 is stored in this through hole (not shown). A through hole 74 is provided in the detonator case 70 from the position storing the detonator 73 to the rear end of the gas-generating agent 68 in the backward direction of the vehicle body. The through hole 74 guides a spark generated by the ignited detonator 73 to the gas-generating agent 68. A pin 78 penetrating through the bracket 36 is secured to the detonator case 70 so that both can be held stationary.

As shown in FIG. 1, a cylindrical sensor storing member 80, serving as a supporting member and having an aperture at an end in the axial direction, is integrally formed on the lateral surface of the bracket 36 and behind the fixing member 38 (in the inward direction of the vehicle body). The aperture 82 of the sensor storing member 80 is disposed in the inward direction of the vehicle cabin. A through hole 84 is provided through the coaxial line of the hole of the detonator case 70. A rectangular notch 86 is formed on part of the circumferential wall of the sensor storing member 80. The preloader sensor unit 32 is stored in the aperture 82 of this sensor storing member 80.

The preloader sensor unit 32 is stored in an accommodating portion or container including a case 88 (in the outer side of the vehicle cabin) and another case 90 (in the inner side of the vehicle cabin) which are split into two parts across a plane orthogonally intersecting the axial direction of the middle region. A pair of notches 89 are formed on the opposite ends in the radial direction of the outer case 88 such that these notches 89 are engaged with a pair of projections 91 formed on the opposite ends in the radial direction of the inner case 90.

A cylindrical projection 92 (shown in FIGS. 2 and 3) is integrally formed in conjunction with the outer case 88 and reaches the detonator 73 through the through hole 84 of the sensor storing member 80 along the externally projected axis of the outer case 88. A guide path 94 (shown in FIGS. 2 and 3), leading to the detonator 73, of an ignition pin 112 (to be described later on) is provided through the axis of the cylindrical projection 92.

A cylindrical shaft storing space 96 is vertically formed across the diameter of the outer and inner cases 88 and 90 for storing a drive shaft 98. The drive shaft 98 provides with a cylindrical base member 98A, a long shaft 98B, and a short shaft 98C, such that these shafts project and orthogonally intersect each other from regions adjacent to both ends in the axial direction of the cylindrical base member 98A. A pair of small projection 100 are coaxially formed on both end surfaces of the cylindrical base member 98A and rotatably supported by a pair of notches 102 which are formed on both ends in the longitudinal direction of the cylindrical shaft storing space 96.

A cylindrical storage space 104 is formed in the outer case 88 in parallel with axial direction of the outer case 88 itself. This space 104 is available for insertion of a bias spring 106. A bias pin 108 is coupled with play with an end of the bias spring 106. The other end of the bias spring 106 is engaged with the lateral surface of the outer case 88. Because of this mechanism, the bias spring 106 energized the bias pin 108 in the direction of arrow C shown in FIG. 1. The tip of the bias pin 108 is held in contact with the region adjacent to the tip of the short shaft 98C of the drive shaft 98.

A notch 110 is formed at the middle part in the axial direction of the cylindrical base member 98A of the drive shaft 98. A collar member 112A of the shaft-like ignition pin 112 is engaged with the notch 110. The shaft-like ignition pin 112 is coupled with play with an end of a compressed coil spring 114. The other end of the compressed coil spring 114 is engaged with a spring supporting 116 (shown in FIG. 3) provided in the inner case 90. Accordingly, the compressed coil spring 114 energizes the ignition pin 112 in the direction of arrow D shown in FIG. 3.

An inertial ball 118 remains in contact with a region close to the tip in the axial direction of the long shaft 98B. The inertial ball 118 is held by a cylinder 119 held in a cylinder holding space (not shown) provided in the inner case 90. The inertial ball 118 inertially moves in the forward direction (in the direction of arrow E shown in FIG. 2) when the vehicle suddenly decelerates.

As shown in FIG. 2, the inner case 90 has a space 120 in the direction of the inertial movement of the ball 118 to store a releasing plate 122. The releasing plate 122 also has an L-shaped section in the direction orthogonally intersecting the widthwise direction. The releasing plate 122 consists of a base member 122A and a vertically bent member 122B. The vertically bent member 122B is installed along a vertical wall 120A of the space 120. The base member 122A is disposed on the bottom wall 120B of the space 120. A circular hole 124 is provided through the center of the base member 122A.

A cylindrical projection 126 projects in the direction opposite from the shooting direction of the ignition pin 112 (in the direction of arrow D shown in FIG. 3) from the inner edge surface of the inner case 90. The cylindrical projection 126 makes up part of the preloader sensor unit 32 in which the inertial ball 118 is disposed at a specific angle. A female screw 128 (shown in FIG. 1) is formed on the internal circumferential surfaces of the cylindrical projection 126 and the circular hold 124.

A releasing bolt 130 is engaged with the female screw 128. A male screw 132 is formed on the external circumferential surface of the intermediate axial member 130A of the releasing bolt 130. The outer axial tip member 130B of the releasing bolt has a diameter smaller than that of the intermediate axial member 130A. The outer axial tip member 130B is caulked through the circular hole 124 of the releasing plate 122 (see FIG. 2).

Accordingly, when the releasing bolt 130 is thrust in the direction of arrow F shown in FIG. 2, the edge surface (in the backward direction of the vehicle body) of the base member 122A of the releasing plate 122 remains in contact with the surface of the long shaft 98A of the drive shaft 98 at a position opposite from the inertial ball 118. This in turn prevents the drive shaft 98 from being rotated in the direction of arrow G (shown in FIG. 1) by the inertial movement of the ball 118.

As shown in FIG. 1, a disc-shaped cover 34 is disposed at an end opposite from the shooting direction of the ignition pin 112 of the inner case 90. A rectangular projection 136 is provided at a position in the radial direction of the disc-shaped cover 34 such that the rectangular projection 136 is engaged with the notch 86 of the sensor storing space. The disc-shaped cover 34 is provided with a bolt insertion through hole 138 at a position closer to the axis than the projection 136. The cylindrical projection 126 is inserted through the hole 138.

After the engagement of the rectangular projection 136 with the notch 86 and the insertion of the cylindrical projection 126 through the hole 138, the preloader sensor 32 is prevented from moving in the circumferential direction. A cylindrical projection 140 for identifying the forward and backward surfaces of the disc-shaped cover 34 is provided at a position close to the external circumference of the disc-shaped cover 34 in the direction opposite from the entering direction (in the direction of arrow F shown in FIG. 2) of the releasing bolt 130.

The webbing retractor 10 is now complete with the provision of the preloader 28 incorporating the preloader sensor unit 32 having the structure mentioned above. In addition, the webbing retractor 10 is provided with an acceleration, sensor capable of detecting the sudden deceleration of the vehicle and a locking mechanism which is activated by this acceleration sensor to instantaneously inhibit the webbing shaft 22 from rotating in the direction of pulling out the webbing 26. Illustration of the locking mechanism is omitted.

When the webbing retractor 10 is used in a 3-point seat belt fastening unit with continuous webbing, the end of the 26 drawn out of the webbing shaft 22 is engaged with the vehicle body via an anchor member. The middle part of the webbing 26 is folded backward by a slip joint (not shown) engaged with the vehicle body. In addition, a tongue plate (not shown) is slidably installed between the anchor member and the slip joint in the longitudinal direction. After drawing out the webbing 26 from the winding shaft 22, the vehicle occupant couples the tongue plate with the buckle unit of the vehicle body so that he can bind himself with the webbing 26.

Figure 4A:
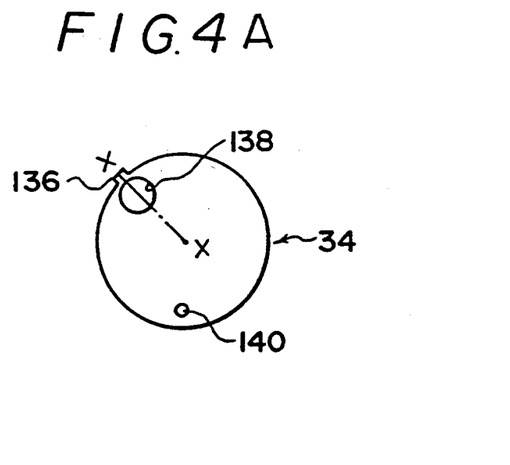
FIG. 4A, 4B, 5A, 5B, 6A, 6B, 7A and 7B are respectively schematic front views of the cover members corresponding to inclined angles in the longitudinal direction of the vehicle body against the vertical direction of the webbing retractor as seen from the lateral position of the vehicle.
Figure 4B:
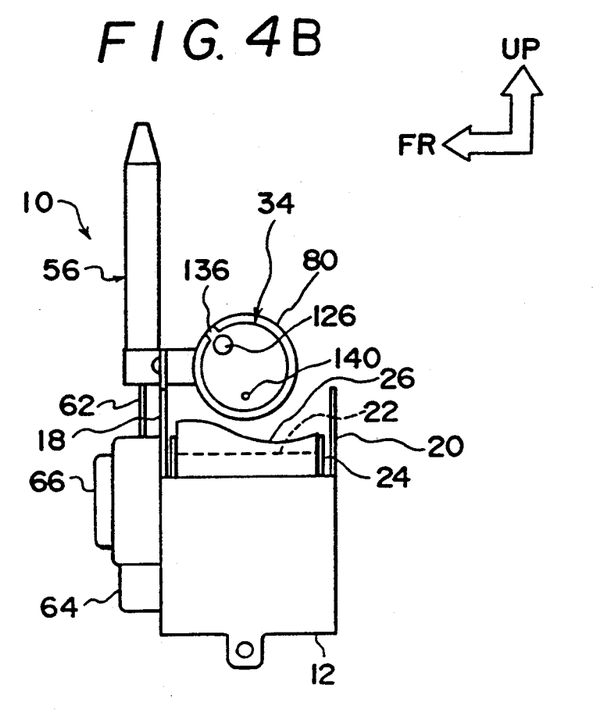
Figure 5A:
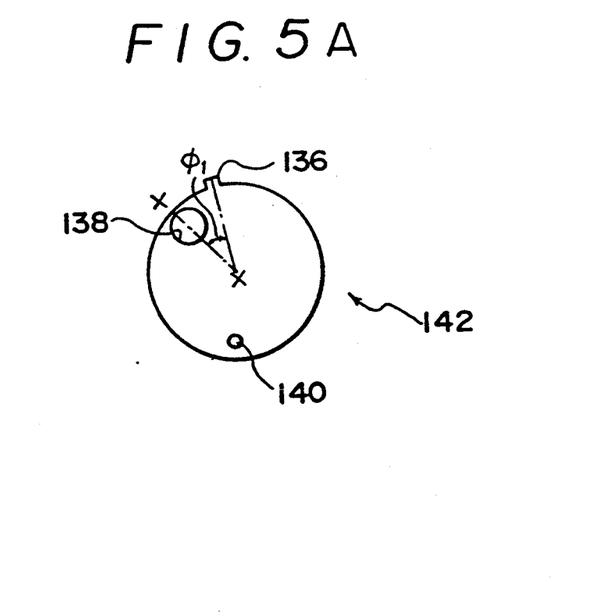
Figure 5B:
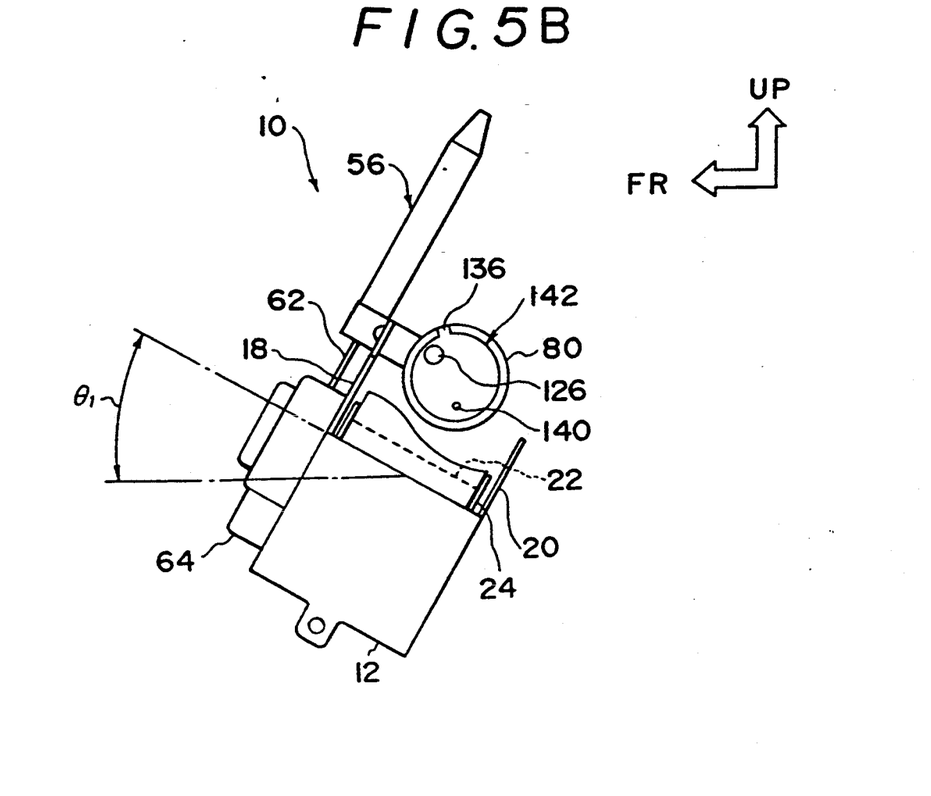
Figure 6A:
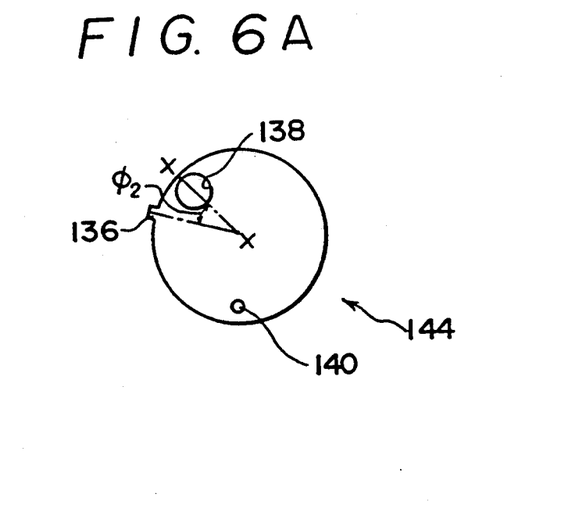
Figure 6B:
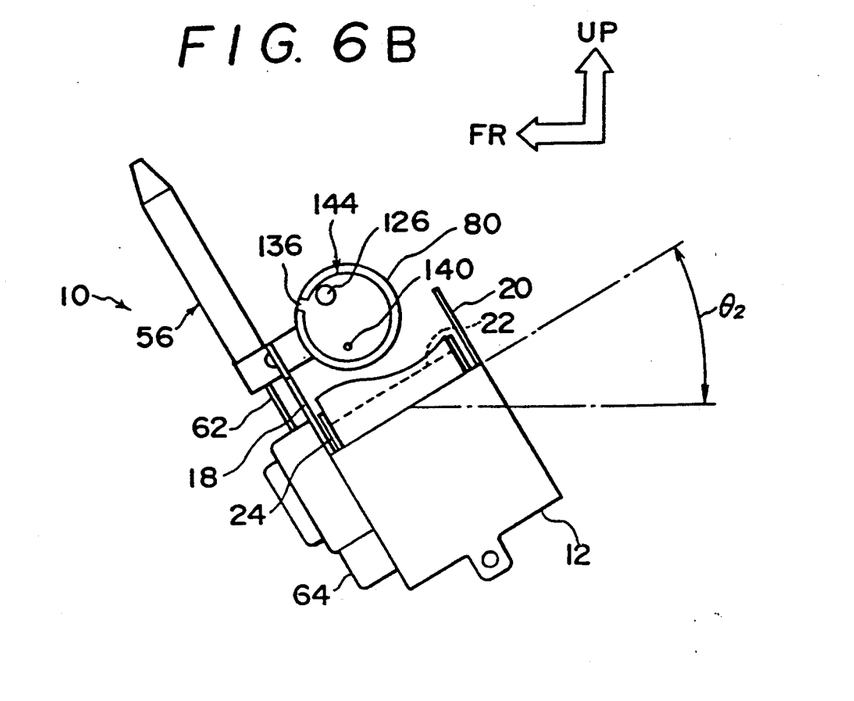

Referring now to FIGS. 4 through 7, functional operation of the preloader 28 embodied by the invention is described below by referring to a case in which the webbing retractor 10 incorporating the preloader 28 is installed to a variety of vehicles. Incidentally, vehicles in which the webbing retractor 10, shown in FIGS. 4-6, is used are equipped with right-side steering wheels.

First, refer to FIG. 4-B. When installing the webbing retractor 10 to such a vehicle which horizontally accommodates the winding shaft 22 in the longitudinal direction of the vehicle body, the disc-shaped cover 34, shown in FIG. 4-A, having the projection 136 and the through hole 138 on the same radial direction line is used. This radial direction line is hereinafter called the reference line X—X. Namely, first the cylindrical projection 126 of the preloader sensor unit 32 is inserted through the bolt insertion through hole 138 of the disc-shaped cover 34. Then, in the course of inserting the preloader sensor unit 32 into the sensor storing member 80, the projection 136 of the disc-shaped cover 34 is engaged with the notch 86. As a result, the preloader sensor unit 32 is correctly positioned so that the ball 118 can inertially move in the forward direction of the vehicle body, in other words, in the direction of arrow E shown in FIG. 2.

Next, refer to FIG. 5-B. When installing the webbing retractor 10 to a vehicle body in which the preloader sensor unit 32 is mounted at an inclined angle $\theta_1$ about 30° in the rearward direction of the vehicle, formed between the winding shaft 22 and the horizontal line in the longitudinal direction of the vehicle body, a disc-shaped cover 142 shown in FIG. 5A having a bolt insertion through hole 138 is used. The bolt insertion through hole 138 is provided on the reference line X—X. The projection 136 is formed at an inclined angle $\phi_1$ of about 30° from the reference line X—X. Since the sequence of mounting the preloader 28 shown in FIG. 5 is exactly identical to that described in FIG. 4, the description of the mounting sequence is omitted.

Refer now to FIG. 6-B. When installing the webbing retractor 10 to a vehicle body to which the preloader 28 is mounted at an inclined angle $\theta_2$ of about 30° in the forward direction of the vehicle, formed between the winding shaft 22 and the horizontal line in the longitudinal direction of the vehicle body, a disc-shaped cover 144 shown in FIG. 6-A having a bolt insertion, through hole 138 is used. The bolt insertion through hole 138 is formed on the reference line X—X. The projection 136 is formed at an inclined angle $\theta_2$ of about 30° from the reference line X—X. In other words, the relationship between the projection 136 and the bolt insertion through hole 138 of the disc-shaped cover 144 shown in FIG. 6-A is inverse from the one shown in FIG. 5-A. Since the sequence of mounting the preloader 28 shown in FIG. 6 is exactly identical to that described in FIG. 4, description of the mounting sequence is omitted.

Figure 7A:
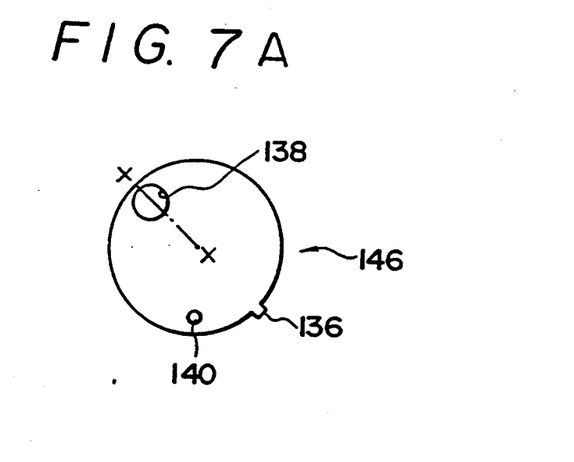
Figure 7B:
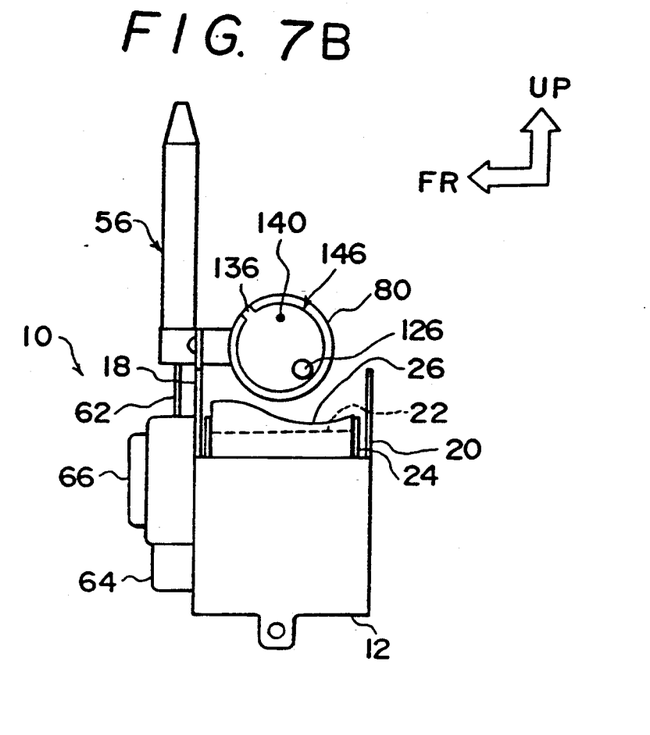

Refer now to FIG. 7-B. In this embodiment, the webbing retractor 10 is mounted on a vehicle body having a left-side steering wheel. Like the webbing retractor 10 shown in FIG. 4-B, the winding shaft 22 of the webbing retractor 10 is horizontally disposed in the longitudinal direction of the vehicle body. The disc-shaped cover 146 has a projection 136 on the line extended from the reference line X—X. In this case, the disc-shaped cover 146 has the projection 136 and a bolt insertion through hole 138 which are disposed opposite from each other in the radial direction as shown in FIG. 7-A. Since the sequence of mounting the preloader 28 shown in FIG. 7 is exactly identical to that described in FIG. 4, description of the mounting sequence is omitted here.

In this way, the preloader 28 is positioned by the disc-shaped covers 34, 142, 144 and 146, before being inserted in the sensor storing member 80 of the webbing retractor 10. When securing the webbing retractor 10 to the vehicle body, the releasing bolt 130 is thrust in the screwing direction (in the direction of arrow F shown in FIG. 2). As a result, the ball 118 is prevented from inertially moving in the direction of arrow E shown in FIG. 2, and thus, the ignition pin 112 cannot hit against the detonator 73. After the webbing retractor 10 is installed onto the vehicle body, the releasing bolt 130 is shifted in the direction opposite from the screwing direction. This allows the vehicle driver and passenger to bind themselves with the webbing on their seats.

After binding the vehicle occupant with the webbing 10, the winding shaft 22 can freely be rotated in the direction of winding and unwinding the webbing 26 by following the posture of the vehicle occupant in the normal running state of the vehicle. This also allows the webbing 26 to freely be unwound from and wound onto the winding shaft 22 by following changes in the posture of the vehicle occupant, and therefore, no constraint is applied to the vehicle occupant.

In the event that the vehicle suddenly decelerates, the ball 118 inertially moves in the direction of arrow E shown in FIG. 2. As a result, the drive shaft 98 rotates in the direction of arrow G against the urging force of the bias spring 106, thus causing the collar member 112A of the ignition pin 112 to be disengaged from the notch 110 of the drive shaft 98. As a result, the ignition pin 112 is driven in the direction of arrow D shown in FIG. 3 by the urging force of the compressed coil spring 114 before exploding the detonator 73. A spark generated by the exploded detonator 73 passes through the through hole 74 and causes a reaction of the gas-generating agent 68. The reaction instantaneously generates an enormous volume of gas. Then gas is led into the cylinder 56 to instantly drive the piston 61 upward in the direction of arrow I shown in FIG. 1. As a result, the wire 62 is instantaneously pulled upward and engages with a clutch mean (not shown) so that the winding shaft 22 can be forcibly rotated in the direction of winding the webbing 26 (in the direction of arrow A shown in FIG. 1), thus allowing the webbing 26 to tightly restrain vehicle occupant.

Further, at the same time, due to the inertial movement of the ball 118, the webbing 26 is apt to be drawn out of the webbing retractor 10. However, a locking mechanism (not shown) is quickly activated to inhibit the winding shaft 22 from rotating in the direction of pulling out the webbing 26. As a result, the winding shaft 22 is inhibited from rotating in the direction of pulling out the webbing 26. As a result, the vehicle occupant is securely restrained by the tightly fitted webbing 26.

As is clear from the above description, according to the preloader embodied by the invention, even though there are a variety of vehicles, the identical preloader 32 can effectively be applied to them merely by preparing the disc-shaped cover 34 so that it corresponds to the tilted angle according to the kind of vehicle. This in turn allows the manufacturer to dispense with new design and manufacturing processes needed for each component part of the webbing retractor 10 corresponding to different types of vehicles. Consequently, the manufacturer can reduce the manpower needed for making the new design and manufacturing processes, thus making it possible for the manufacturer to drastically reduce the costs necessary to manufacture the webbing retractor 10.

The ignition pin 112 is located at the axial line of the preloader sensor unit 32 built in the preloader 28 embodied by the invention. Because of this arrangement, the inertial movement of the inertial ball 118 is constantly oriented in the forward direction of the vehicle body, in other words, in the direction of arrow E shown in FIG. 2. As a result, the precision of the performance of the inertial ball 118 in detecting a state of sudden deceleration of the vehicle remains unaffected.

Figure 8:
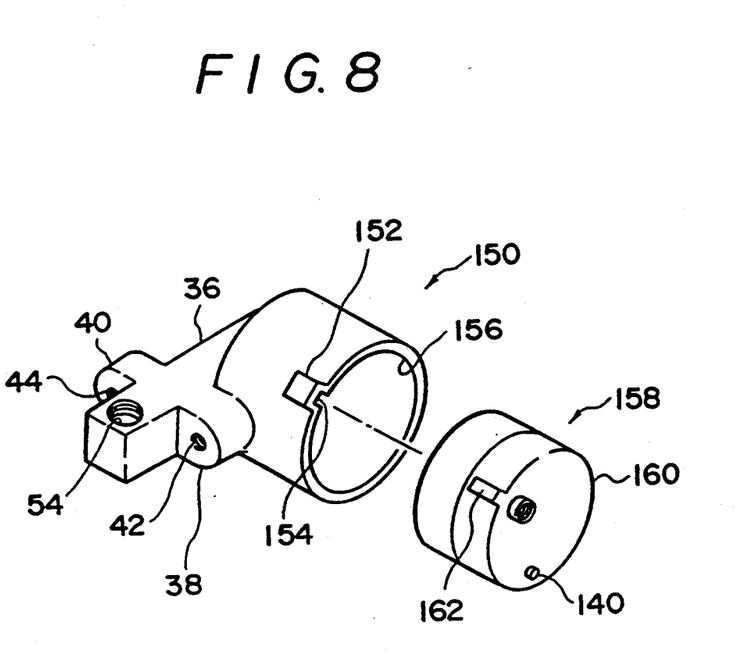
FIGS. 8, 9 and 10 are respectively schematic perspective views of varied embodiments of the sensor-storing member, preloader sensor, and the disc-shaped cover of the preloader shown in FIG. 1.

Referring now to FIG. 8, varied embodiments of the sensor storing member 80, the preloader sensor unit 32, and the disc-shaped cover 34, are described below.

As shown in FIG. 8, in place of the notch 86 of the preceding sensor storing member 80, a projection 152 is provided for the sensor storing member 150 at a position corresponding to the notch 86. The projection 152 has ] shaped section on the plane orthogonally intersecting the axial direction of the sensor storing member 150. A groove 154 of the projection 152 is connected to the open space 156 of the sensor storing member 150. A case 160 accommodates the preloader sensor 158 stored in the open space 156. A projection 162 of a rectangular-parallelepiped form is integrated with the case 160 on circumferential surface of the case 160. This projection 162 replaces the function of the preceding notch 136. The projection 162 is engaged with the groove 154 of the projection 152 and positions the periphery in the axial direction of the preloader sensor 158 so that the preloader sensor 158 can be inhibited from moving in the circumferential direction of the open space 156.

When using the mechanical structure mentioned above, the varied embodiment can dispense with a component part corresponding to the disc-shaped cover 34. As a result, the manufacturer can reduce the number of component parts and the costs necessary to manufacture the webbing retractor 10 as well. Since the projection 162 provided on the case 160 storing the preloader sensor 158 positions the periphery in the axial direction of the preloader sensor 158, in contrast with a case in which a plurality of positioning means is provided by a separate member, it is possible for the varied embodiment to minimize assembly error and securely hold the preloader sensor 158 in the sensor storing member 150.

Figure 9:
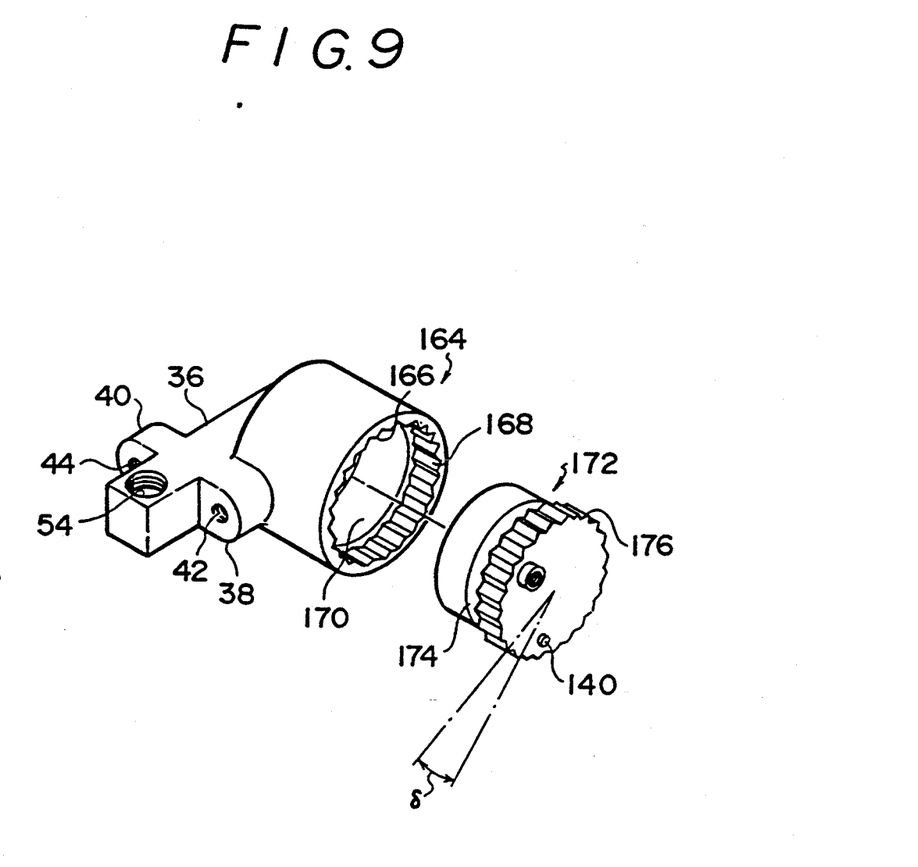

Referring now to FIG. 9, another varied embodiment of the sensor storing member 80, the preloader sensor 32, and the disc-shaped cover 34, is described below.

The sensor storing member 164 shown in FIG. 9 is provided with internal gear teeth 168 in a depthwise range from the edge of aperture 166 to the intermediate part of the inner circumferential surface in the axial direction of the sensor storing member 164. A cylindrical recess 170 is internally formed further from the internal gear teeth 168 in the axial direction up to the opposite edge surface of the sensor storing member 164. The cylindrical recess 170 stores the preloader sensor 172. External gear teeth 176, engageable with the internal gear teeth 168, are integrally provided on the external circumferential surface of the case 174 on the side apart from the sensor storing member 164. Taking the sensitivity of the preloader sensor 172 into consideration, pitch S of the external gear teeth 176 is provided in a range from 20 degrees to 30 degrees. If the pitch S of the external gear teeth were $+/-10$ degrees, then $+/-\cos 10° = 0.98$. This indicates that the assembly angle of the preloader sensor 172 relative to the sensor storing member 164 merely varies by $+/-2\%$, and thus, this is by no means effective.

Like the sensor storing member 150 and the preloader sensor 158 shown in FIG. 8, the number of component parts used in the sensor storing member 164 and the preloader sensor 172 shown in FIG. 9 can also be reduced to result in reduced costs, necessary to manufacture the webbing retractor 10 as well. According to the mechanical structure mentioned above, in contract with a case in which the preloader sensor 32 or 158 is engaged with the sensor storing member 80 or 150 at a single junction, the whole body of the preloader sensor 172 can be held by the sensor storing member 164 by means of the engagement between the external gear teeth 176 and the internal gear teeth 168. Furthermore, the varied embodiment can more reliably position the preloader sensor 172 in the periphery in the axial direction, and assembly error can also be minimized.

Figure 10:
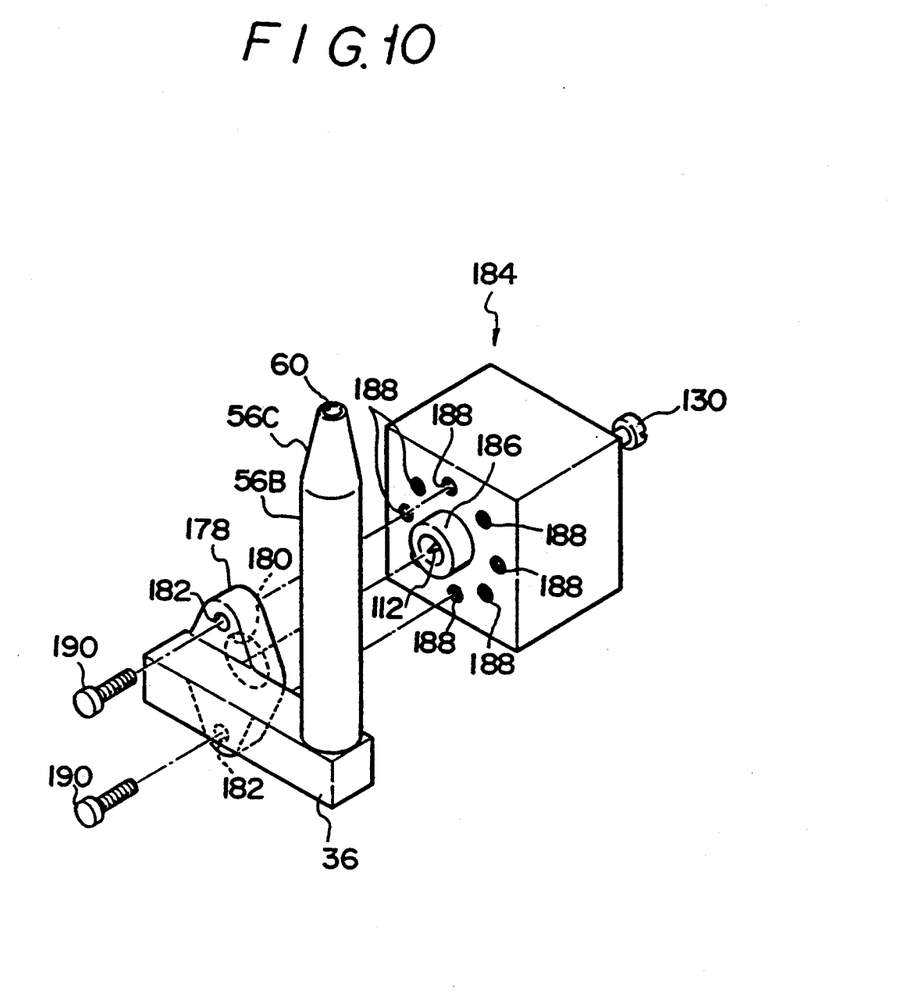

Referring now to FIG. 10, another varied embodiment of the sensor storing member, the preloader sensor 32, and the disc-shaped cover 34, is described below.

As shown in FIG. 10, a substantially elliptical flange 178 is integrally set to the bracket 36, and a through hole 180 is provided through the center of this flange 178. In addition, a pair of circular holes 182 are lengthwise provided above and below the through hole 180. A detonator 73 is installed in the bracket 36 in the same axial direction as that of the through hole 180.

The preloader sensor 184 has a substantially cubic shape, in which an ignition pin 112 is provided on the axial line which links intersections of diagonal lines of a pair of opposite surfaces. A cylindrical projection 186 projects from one of the lateral surfaces of the preloader sensor 184 in the shooting direction of the ignition pin 112. A plurality of screw holes 188 are provided at the external periphery of the cylindrical projection 186 at specific intervals.

After the cylindrical projection 186 is engaged with the through hole 186 of the flange 178, the assembly position of the preloader sensor 184 is determined by adjusting the position of the circular hole 182 of the flange 178 in order to match the corresponding screw hole 188 of the preloader sensor 184 on a coaxial line. Next, the applicable screw holes 188 are determined from the viewpoint of the inclined angle of the webbing retractor 10 by considering the positional relationship between the substantially cubic shape of the preloader sensor 184 and the selected screw holes 188. Finally, the bracket 36 is secured to the preloader sensor 184 by engaging bolts with the selected screw holes 188.

According to the mechanical structure shown in FIG. 10, since the preloader sensor 184 itself remains being exposed without being stored in a sensor storing member, the bracket 36 can dispense with the provision of sensor storing members 80, 150, and 164. This in turn allows the varied embodiment to totally dispense with such space otherwise needed for the sensor storing members 80, 150 and 164. As a result, the webbing retractor 10 itself can significantly be made smaller by eliminating space otherwise occupied by the sensor-storing members 80, 150 and 164. Furthermore, since this embodiment introduces the substantially cubic-shaped preloader sensor 184, the manufacturing process can be carried out more easily than in the case of manufacturing the preloader sensor 172 shown in FIG. 9 which is externally provided with the gear teeth 176.

In place of the front and backward identifying projection 140 provided on the disc-shaped covers 34, 142, 144, and 146, shown in FIGS. 4 through 7, designation of the inclined angle may also be implemented by stamping those marks OR, −30R, and +30R, for example.

In the above embodiments, the preloader 32 is solely applied to the webbing retractor 10. However, its uses are not limited to the above embodiments. It is also possible for the embodiment of the invention to effectively combine the webbing retractor 10 with an air-bag system by providing a system to supply gas generated from the reaction of the gas-generating agent 68 to the bag of the air-bag system of the vehicle cabin as well.

What is claimed is:

1. A preloader which is built in a webbing retractor that retracts a webbing for restraining a vehicle occupant in order to tightly restrain the vehicle occupant with said webbing when the vehicle suddenly decelerates, comprising:
   a preloader sensor unit which incorporates an inertial member that inertially moves in the forward direction of the vehicle body when the vehicle suddenly decelerates, and an ignition member movable in a direction for firing a detonator by the movement of said inertial member;
   an accommodating portion which accommodates said preloader sensor unit; and
   a supporting member in which said accommodating portion is installable by rotation of said accommodating portion, wherein said accommodating portion is rotated around said direction of the movement of said ignition member at a predetermined interval of rotative angle relative to a reference position.

2. A preloader according to claim 1, wherein said accommodating portion is secured to said supporting member in the condition in which said accommodating portion remains being accommodated in said supporting member, wherein said accommodating portion is of a cylindrical form whose axis of rotation is parallel to the direction of the movement of said ignition member, and wherein said supporting member has a cylindrical recess with a bottom surface capable of storing said accommodating portion.

3. A preloader according to claim 2, further comprising:
   display means provided on an external surface of said accommodating portion and having a specific positional relationship with said inertial member, and wherein said display means displays said positional relationship.

4. A preloader according to claim 3, wherein said display means is substantially a hole designating a reference position of said inertial member.

5. A preloader according to claim 3, further comprising:
   positioning means respectively installed to said accommodating portion and said supporting member for executing a positioning operation in relation to the display of said display means in the course of securing said accommodating portion to said supporting member.

6. A preloader according to claim 5, wherein said positioning means comprises a recess provided for one of said supporting member and said accommodating portion and a projection which is provided for the other among said supporting member and said accommodating portion engageable with said recess.

7. A preloader according to claim 5, wherein said positioning means comprises external gear teeth provided on an external circumferential surface of said accommodating portion and internal gear teeth provided on the internal circumferential surface of said cylindrical recess held in engagement with said external gear teeth.

8. A preloader according to claim 2, further comprising:
   a cover member secured to an exterior of said accommodating portion and enveloping said accommodating portion, wherein said cover member is stored in said cylindrical recess in conjunction with said accommodating portion, and wherein said cover member and said supporting member are respectively provided with positioning means for executing a positioning operation when storing said accommodating portion in said supporting member.

9. A preloader according to claim 8, wherein said positioning means comprises a recess provided in one of said supporting member and said cover member, and a projection provided for the other of said supporting member and said cover member for engagement with said recess.

10. A preloader according to claim 1, further comprising:
    display means substantially comprised of the external configuration of said accommodating portion, wherein said display means has a specific positional relationship with said inertial member and displays a reference position of said inertial member.

11. A preloader according to claim 10, further comprising:

positioning means respectively set to said accommodating portion and said supporting member for executing a positioning operation in relation to the display of said display means in the course of securing said accommodating portion to said supporting means, wherein said positioning means comprises a plurality of holes provided on said accommodating portion in annular formation around the direction of the movement of said ignition member at specific intervals and a plurality of holes provided on said supporting member that can be linked with any of said plurality of holes provided on said accommodating portion.

12. A preloader which is built in a webbing retractor that retracts a webbing for restraining each vehicle occupant in order to tightly restrain each vehicle occupant with a webbing when the vehicle suddenly decelerates, comprising:

a preloader sensor unit: including a ball member for inertially moving in the forward direction of the vehicle body when the vehicle suddenly decelerates; a ball supporting member which is displaced as a result of the inertial movement of said ball member; an energizing means which is activated by said displaced ball supporting member; and an ignition member movable in a direction for firing a detonator by the operation of said energizing means;

a container accommodating said preloader sensor; and a supporting member in which said container is installable by activated movement of said ignition pin at a predetermined interval of rotative angle relative to a reference position.

13. A preloader according to claim 12, wherein said container is secured to said supporting member in a condition in which said container remains accommodated in said supporting member, wherein said container comprises an assembled unit of a plurality of cylindrical members, each having an axis of rotation in the direction of firing of ignition pin, and wherein said supporting member has a cylindrical recess with a bottom surface capable of accommodating each cylindrical member.

14. A preloader according to claim 13, further comprising:

display means provided on the external surface of said container that has a specific positional relationship with said inertial ball, and wherein said display means displays said positional relationship.

15. A preloader according to claim 14, wherein said display means includes a hole designating the reference position of said inertial ball, and wherein said hole is provided on the external surface of a first member which is closest to the aperture of said cylindrical recess among said plurality of cylindrical members in the condition of being accommodated in said cylindrical recess.

16. A preloader according to claim 15, further comprising:

positioning means provided for said container and said supporting member for executing a positioning operation in relation to the display of said display means in the course of securing said container to said supporting means.

17. A preloader according to claim 16, wherein said positioning means includes a recess which is provided on one of the external circumferential surface of said first member and a region adjacent to the aperture of said cylindrical recess, and a projection which is set to the other of the external circumferential surface and the region adjacent to the aperture engageable with said cylindrical recess.

18. A preloader according to claim 16, wherein said positioning means comprises external gear teeth provided on the external circumferential surface of said first member and internal gear teeth provided on the internal circumference of the aperture of said cylindrical recess for engagement with said external gear teeth.

19. A preloader according to claim 15, further comprising:

a disc-shaped cover member secured to the exterior of said first member in alignment with the position of the hole of said first member, wherein said cover member envelops said container and is stored in said cylindrical recess in conjunction with said container, and wherein said cover member and said supporting member are respectively provided with a positioning means for executing a positioning operation in the course of accommodating said container in said cylindrical recess.

20. A preloader according to claim 19, wherein said positioning means includes a recess provided for one of a region adjacent to the aperture of the cylindrical recess and a region in the periphery of said cover member and a projection provided for the other of the region adjacent to the aperture and the region in the periphery of said cover member engageable with said recess.

* * * * *